(12) United States Patent
Krajewski et al.

(10) Patent No.: US 8,220,693 B2
(45) Date of Patent: Jul. 17, 2012

(54) MODIFIED SURFACES USING FRICTION STIR PROCESSING

(75) Inventors: Paul E. Krajewski, Troy, MI (US); Yen-Lung Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 256 days.

(21) Appl. No.: 12/614,489

(22) Filed: Nov. 9, 2009

(65) Prior Publication Data
US 2011/0111246 A1 May 12, 2011

(51) Int. Cl.
*B23K 20/12* (2006.01)
(52) U.S. Cl. .................. 228/112.1; 228/159; 228/199
(58) Field of Classification Search ............... None
See application file for complete search history.

(56) References Cited

U.S. PATENT DOCUMENTS

| | | | |
|---|---|---|---|
| 6,457,629 B1 * | 10/2002 | White | 228/112.1 |
| 6,854,632 B1 * | 2/2005 | Larsson | 228/2.1 |
| 7,163,138 B1 * | 1/2007 | Dudt et al. | 228/112.1 |
| 7,455,211 B2 * | 11/2008 | Kay | 228/112.1 |
| 7,487,901 B2 * | 2/2009 | Talwar et al. | 228/112.1 |
| 7,523,850 B2 * | 4/2009 | Barnes | 228/112.1 |
| 7,740,162 B2 * | 6/2010 | Ilyushenko et al. | 228/112.1 |
| 7,905,383 B1 * | 3/2011 | Torng et al. | 228/112.1 |
| 8,006,890 B2 * | 8/2011 | Okamoto et al. | 228/2.1 |
| 8,052,032 B2 * | 11/2011 | Park et al. | 228/112.1 |
| 2002/0079351 A1 * | 6/2002 | Mishra et al. | 228/112.1 |
| 2003/0042292 A1 * | 3/2003 | Hatten et al. | 228/112.1 |
| 2003/0047587 A1 * | 3/2003 | Aono et al. | 228/112.1 |
| 2003/0075584 A1 * | 4/2003 | Sarik et al. | 228/2.1 |
| 2004/0020970 A1 * | 2/2004 | Palm | 228/112.1 |
| 2004/0055666 A1 * | 3/2004 | Forrest et al. | 148/400 |
| 2004/0074948 A1 * | 4/2004 | Kusunoki et al. | 228/112.1 |
| 2005/0139640 A1 * | 6/2005 | Kay | 228/112.1 |
| 2005/0242158 A1 * | 11/2005 | Bolser | 228/112.1 |
| 2006/0054655 A1 * | 3/2006 | Mishra et al. | 228/2.1 |
| 2006/0108031 A1 * | 5/2006 | Haynes | 148/513 |
| 2006/0108394 A1 * | 5/2006 | Okaniwa et al. | 228/101 |
| 2006/0124701 A1 * | 6/2006 | Chen et al. | 228/112.1 |
| 2007/0040006 A1 * | 2/2007 | Charles et al. | 228/112.1 |
| 2007/0044406 A1 * | 3/2007 | Van Aken et al. | 52/459 |
| 2007/0241164 A1 * | 10/2007 | Barnes et al. | 228/101 |
| 2008/0047222 A1 * | 2/2008 | Barnes | 52/693 |
| 2008/0230584 A1 * | 9/2008 | Lederich et al. | 228/112.1 |
| 2009/0068492 A1 * | 3/2009 | Fujii et al. | 428/615 |
| 2009/0152328 A1 * | 6/2009 | Okamoto et al. | 228/112.1 |
| 2009/0261146 A1 * | 10/2009 | Hou et al. | 228/112.1 |
| 2010/0167083 A1 * | 7/2010 | Park et al. | 428/615 |
| 2010/0252170 A1 * | 10/2010 | Feng et al. | 156/73.5 |
| 2010/0288817 A1 * | 11/2010 | Yao | 228/2.1 |
| 2011/0048958 A1 * | 3/2011 | Wang et al. | 205/206 |
| 2011/0076419 A1 * | 3/2011 | Yang et al. | 427/554 |
| 2011/0113950 A1 * | 5/2011 | Reed et al. | 89/36.02 |

FOREIGN PATENT DOCUMENTS

WO    WO 2009/142070 A    *    4/2009

* cited by examiner

*Primary Examiner* — Kiley Stoner
(74) *Attorney, Agent, or Firm* — Reising Ethington P.C.

(57) ABSTRACT

A procedure for incorporating particles to a predetermined depth in a body to develop a composite surface layer using friction stir processing is described. The process comprises; preparing the surface of the body; applying particulate matter to the prepared surface; selecting a friction stir tool with a pin length substantially equal to the desired composite layer thickness; using a friction stir process to frictionally heat, stir and intermix the particulate matter with the matrix of the article; and traversing the friction stir tool across the body.

10 Claims, 3 Drawing Sheets

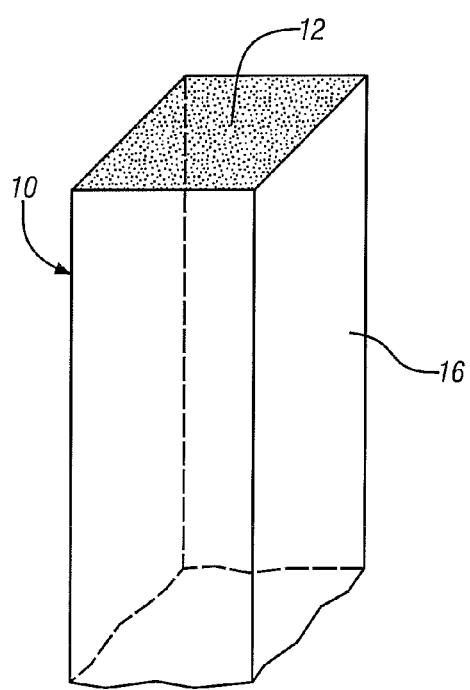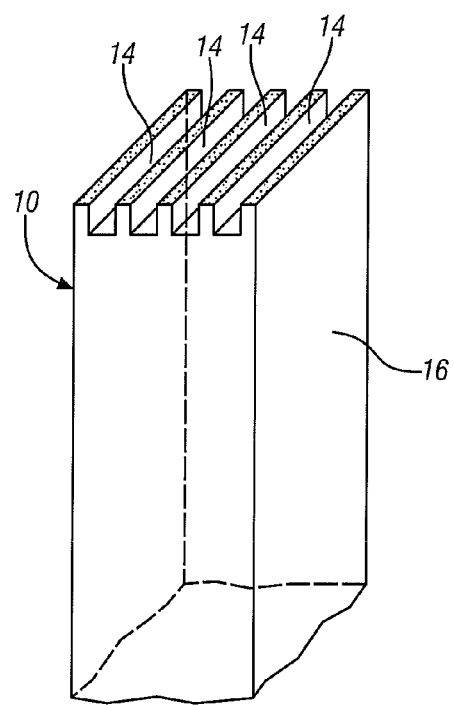
FIG. 3A       FIG. 3B
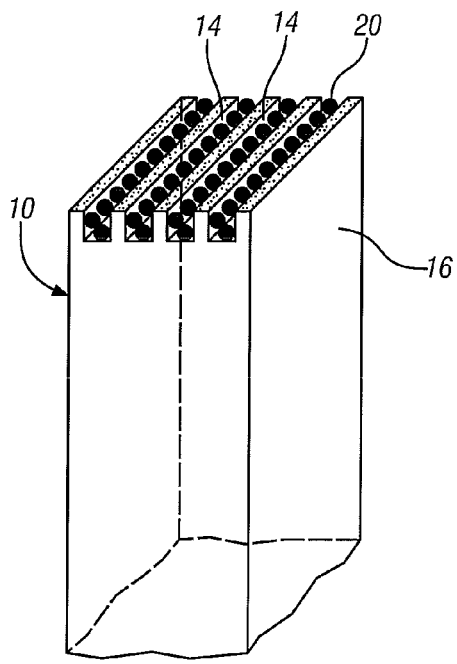
FIG. 3C

MODIFIED SURFACES USING FRICTION STIR PROCESSING

TECHNICAL FIELD

This application relates to processes for selective modification of surfaces through friction stir methods. More specifically, this disclosure pertains to the incorporation of surface modifying particles into workpiece surfaces using a friction stir processing tool.

BACKGROUND OF THE INVENTION

The forming of automotive body panels such as doors or decklids is accomplished through the interaction of an initially planar blank with complementary, contoured forming tools, or dies, under the urging of a load applied by a forming press. The load distribution on the dies is highly non-uniform, with some regions of the dies experiencing high loads while others are only lightly loaded. Because there will be at least some relative motion between the sheet metal blank and the dies, the magnitude of the local applied load significantly influences the local interaction between the blank and the dies.

Under high load, the interaction between sheet and die can lead to die wear which can modify the die surface finish and die geometry as well as to transfer of material from the blank to the die, usually described as galling or 'die pick-up'. Galling and 'die pick-up' are different, but related mechanisms. The transfer of aluminum from a workpiece to a dies can lead to accumulation of material, resembling a particle on the surface of the die. This is 'die pick-up'. Once a particle is present on the die surface, it can scratch or gall subsequent panels. Galling can lead to additional material transfer or pick-up.

These undesired outcomes have been managed by increasing the die hardness, frequently though surface coatings, or by application of lubricants or combinations of these approaches. However, such coatings and lubricants are expensive; frequently create housekeeping issues related to their application; and convey only temporary benefit thereby necessitating frequent re-application to sustain their effectiveness.

Thus there is a need for processes capable of imparting more durable lubricating surface to dies to better manage the sheet forming process.

SUMMARY OF THE INVENTION

This invention provides a practice for modifying the surface of a workpiece to incorporate particles of a material that desirably alter the properties of the surface. For example, the workpiece may be a die or other forming tool to which enhanced surface lubrication properties or wear resistance properties may be imparted. In other examples, the workpiece may be used in sliding contact or force imparting contact with another article. The workpiece will typically be formed of a metal alloy.

In accordance with embodiments of the invention, a surface of the workpiece is modified to a predetermined depth to receive and temporarily hold particles of a selected surface modifying material. Examples of surface modifying materials include particles of aluminum oxide, boron nitride, cubic boron nitride, graphite, molybdenum disulfide, silicon carbide, and the like. The surface of the workpiece is prepared with particle receptacle cavities such as dimples, pits, slots, and the like by surface machining such as knurling, shot blasting, grinding, drilling, milling, sawing, or the like. When the workpiece surface has been roughened to a depth to hold the particles and achieve a desired surface layer thickness, the particles are placed in the surface receptacles in a suitable quantity. The particles are then worked into the surface by a friction stir processing practice.

Friction stir processing involves rotating and translating a tool shaft with an axially terminal shoulder and at least an axially extending probe or pin and pressing the rotating tool into the particle-containing surface of the workpiece. The pressure of the rotating tool, engaging the surface, heats, softens, and plasticizes the metal surface. The probe (or pin) is sized to penetrate into the workpiece surface to a desired depth when the shoulder of the friction stir tool engages the surface. The rotating tool is also translated over the surface as necessary to mix the particulate material into the intended surface region of the workpiece. The rotating friction stir tool thus mechanically deforms the particle-laden surface without melting the surface metal. When the tool has been moved from a treated surface region, the particles have been stirred into the processed metal of the workpiece. The friction stir treated surface layer may be rough and it may be machined or polished to leave a finished, particle-modified surface region.

The depth of the surface particle receptacle cavities will typically be no greater than the length of the probe to ensure full participation of all the applied particulate material in the particle-modified surface region. The length of a probe on a friction stir tool in embodiments of this invention is usually no greater than about three millimeters.

As stated above, the particulates in the surface layer may be of higher hardness than the workpiece and intended to convey wear resistance, or have lubricating characteristics and be intended to convey lubricity to the workpiece or a combination of both in predetermined proportion. The resulting concentration of particulates is established by knowledge of the stored quantity of particulates and the stirred volume and may be adjusted substantially as required through control of either parameter.

The finished workpiece may then be employed to utilize the properties now provided by the friction stir incorporated particles.

Other objects and advantages of the invention will be apparent from a description of illustrative embodiments which follows in this specification.

BRIEF DESCRIPTION OF THE DRAWINGS

FIGS. 3 A-F show a sequence of operations for practice of the subject invention. These figures illustrate enlarged views of fragmental sections of die insert 10 that is illustrated in the die set of FIG. 2. For simplified illustration the surface of the die section in each of these views is shown as flat.

FIG. 3A shows a die insert section extending from the die surface and extending partially into the die interior.

FIG. 3B shows the die insert section of FIG. 3A after processing to introduce slots or scores into the surface.

FIG. 3C shows the die insert section of FIG. 3B after particulate matter has been applied to the die surface.

DESCRIPTION OF PREFERRED EMBODIMENTS

In forming of sheet metal components through interaction with a die, regions of relatively high forming pressure will be created at particular locations in the die.

Figure 1:
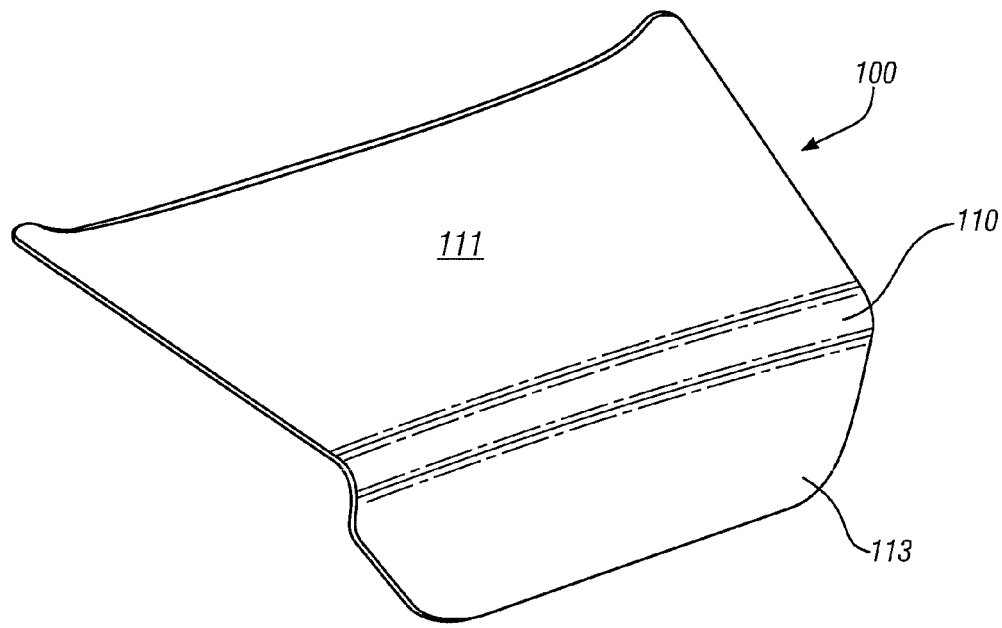
FIG. 1 shows, in perspective view, a typical sheet metal component, a vehicle decklid.
Figure 2:
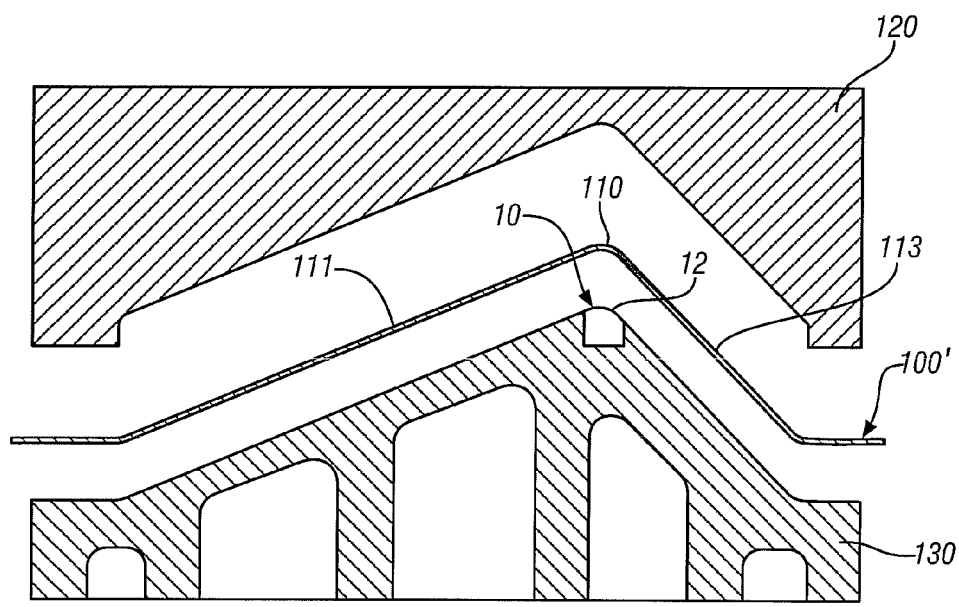
FIG. 2 shows, in side sectional view, a die set suitable for forming of the decklid of FIG. 1 showing the decklid in position in the die set.

This may be illustrated by review of the process employed in forming the decklid 100 shown in FIG. 1 which is formed from decklid blank 100' shown in FIG. 2. The decklid is a closure member for a storage compartment on an automotive vehicle. The most significant forming challenge for this part is the bend feature 110 which transitions upper deck surface 111 to vertical deck surface 113. FIG. 2 shows an upper die 120, a lower die 130 and decklid blank 100' in representative orientation and relative position during forming of the decklid. To balance loads and minimize sheet metal movement or sliding across die surface 12 during forming the decklid blank 100' is tipped such that surfaces 111 and 113 are disposed at generally equal angles to the vertical. Thus bend 110, contacted by die surface 12, is positioned at the highest point of the lower die 130 and is therefore subjected to maximum pressure during the forming operation.

Sheet metal forming dies are largely monolithic devices frequently fabricated of ferrous materials like cast iron. However, it is common in regions of high load or high wear such as die surface 12 located as shown in FIG. 2 to locally replace some portion of the cast iron with a die insert 10 of a more durable material such as tool steel. Practice of this invention anticipates that a similar procedure will be followed and subsequent description will focus on the application of the invention to only insert 10 of lower die 130 without restriction to its application to a similar high load region in a monolithic die. Further, the practice of this invention comprehends its application to ferrous die materials generally without restriction to specific materials such as cast irons or tool steels. Still further it is assumed that any purely thermal treatments such as flame hardening or furnace hardening may be applied subsequent to the process described here.

The process, which generally entails applying friction stir processing to disperse and distribute particles or particulate matter in a surface layer of a body may best be understood by reference to FIGS. 3 A-F.

FIG. 3A shows a perspective view of a small portion of surface 12 of die insert 10 illustrating the die surface 12 and a homogeneous chemical composition 16 as it extends into the die interior.

Figure 3D:
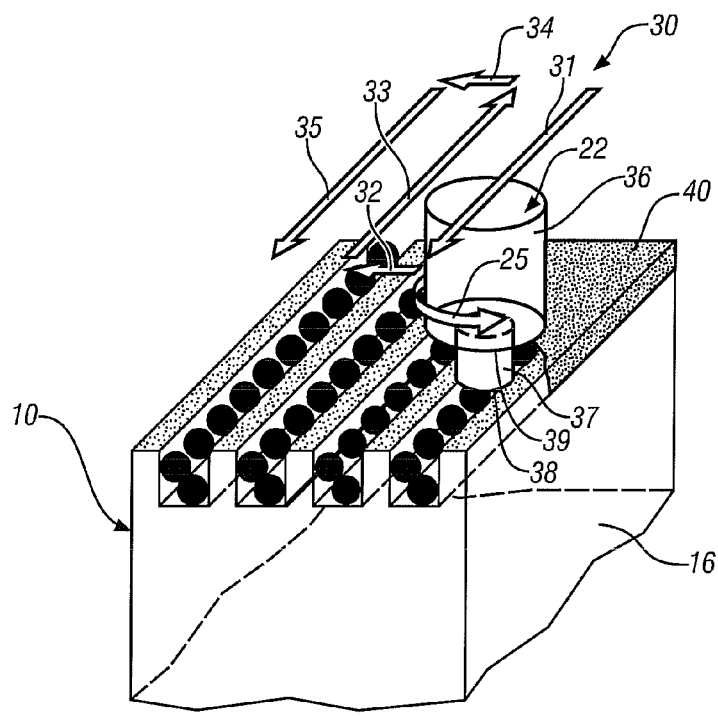
FIG. 3D shows the die insert section of FIG. 3C during friction stir processing.

The intent is to distribute through friction stir processing a quantity of particulate matter within the body of die insert 10 to a depth δ which is substantially equal to the length of pin 37 of the friction stir tool 22 (see FIG. 3D). Since the volume of particulates which may be stably positioned on surface 12 is limited, substantial dilution of the particulates will necessarily occur as these particulates are distributed through the stirred volume. Thus repeated sequences of surface loading of particulates and stirring may be required to fully charge the particulates into the surface region to the desired depth and at the desired concentration. To better enable processing with a single stirring operation, the surface 12 is prepared by application of any of a number of metalworking processes to create surface features and recesses capable of temporarily storing larger volumes of particulates as shown in FIG. 3B.

In FIG. 3B the die is shown after a metal working process has been used to generate these recessed surface features, here shown as slots 14 such as might have been generated, by a saw, an end milling cutter or slot milling cutter. This is however for purpose of illustration only and the surface features can be generated by any appropriate process including knurling, shot blasting, grinding, turning or drilling. Similarly, the surface features in FIG. 3B are depicted as having similar orientation, but this is not a required characteristic and is shown in this manner for convenience only. The depth of the recessed surface features should be suitable for temporarily retaining and storing sufficient particulate material to achieve the desired surface loading or concentration of particles in the stirred surface. However, the depth of the surface features should not exceed the length of the probe, typically about 3 millimeters, on the friction stir tool to assure contribution from all the applied particles.

The surface preparation depicted in FIG. 3B is intended to create surface features capable of temporarily storing particles prior to friction stir processing. In FIG. 3C, particles 20 are shown loosely packed into slots 14. It will be appreciated that the dimensions of particles 20 and slot 14 are related. The surface features are intended for temporary storage of the particles and thus the scale of the surface features should be, at a minimum, slightly larger than the size of the particles so that at least one particle may be fully accommodated in the feature. Since the dimensions of the surface features will not necessarily be regular, this requires that the minimum dimension of a surface feature be at least no less than the particle size and preferably somewhat larger to enable better particle packing. For example, slots with a width of about 1 millimeter would be suitable for retaining and storing 40 mesh particles which are approximately 0.42 millimeters in size.

With the die surface layer loaded with particles a friction stir tool interacts with the particles and the die matrix to mix and intersperse the particles with the die matrix material. As shown in FIG. 3D the friction stir tool 22, rotating in a direction indicated by arrow 25, traces a path generally indicated as 30 and illustrated by the partial set of representative individual lateral motions indicated by 31, 32, 33, 34 and 35 so that the entire relevant surface is processed. The friction stir tool comprises a generally cylindrical shank 36 with a generally cylindrical pin 37 coaxial with it and extending from shank 36 to create a shoulder 39 on the underside of shank 36. A friction stir tool with more than one pin can also be used to effect better mixing; the pins may be of unequal lengths. For good mixing the pin diameter should be no smaller than the spacing between surface features 14. More preferably, for achieving a generally-uniform particle dispersion in the stirred volume with minimal stirring it is preferred that the pin diameter be greater than the spacing of the surface features. By way of example a representative pin diameter is about 6 millimeters.

Friction stir processing requires that rotating pin 37 be plunged into the die surface 12 until shoulder 39 contacts the surface. Then the frictional heating generated by the shoulder and the pin will raise the temperature of the die matrix, reducing its flow stress and increasing its plasticity. In this state the stirring action of the pin will intermingle the die matrix and the particulate matter 20 to create a composite 40 comprising an intimate mixture of die matrix and particles. In general the pin will have surface features to promote uniform stirring. These are well known in the art and are not detailed here. Similarly it is well known in the art that friction stir processing in ferrous alloys can generate temperatures of about 1000° C. and above, which imposes severe thermal demands on the pin 32 requiring that it be fabricated of, for example, cubic boron nitride for durability.

The tool is then traversed across the surface of the insert in suitable manner to expose the entire surface to the stirring action of the tool and thereby achieve a generally uniform concentration of particles in the stirred volume. If necessary, multiple traverses may be employed and a variety of traverse paths may be followed. Similarly the traverse paths may be oriented, relative to any regular surface features such as those shown at 14, in whatever aspect, parallel, orthogonal or inclined, results in the most homogeneous concentration.

In general, heating and stirring will primarily occur in the region between the shoulder 39 and the end of the pin 38. Thus, this dimension should be chosen in expectation of the required depth of the composite 40. Similarly the particle volume fraction of the composite 40 should be chosen in expectation of its anticipated performance.

Achieving a desired particle volume fraction may be most easily achieved through control of the volume of particles added to the surface and may be more readily achieved by having the volume of the surface features (e.g. 14 in FIG. 3B) be generally equal to the desired particle volume fraction after making appropriate allowance for the expected packing fraction. While the scale of the roughness may be chosen arbitrarily, primarily lateral stirring will be required if, for example, the depth of slots 14 approximates the desired depth of the composite layer (shown as δ in FIG. 3E). For a uniform distribution of the added particulate materials the friction stir paths should be sufficiently overlapped.

It will be appreciated from the foregoing that because of less than complete particle packing i.e. a particle packing fraction of less than 100%, the stirred volume of matrix and particles will be less than the initial volume of the die matrix itself. Hence it is desirable that the initial die surface 12 lie slightly above the desired or finished die surface (indicated by 112 in FIG. 3F) to minimize die finishing requirements.

The choice of particles will be dictated by the performance objective and may include hard, rigid particles like silicon carbide, aluminum oxide or cubic boron nitride or lubricious particles like hexagonal boron nitride, or if oxidation can be controlled during the stirring process, for example by conducting stirring under an inert atmosphere, molybdenum disulphide or graphite. Alternatively an appropriate combination may be drawn from each class.

Figures 3E, 3F:
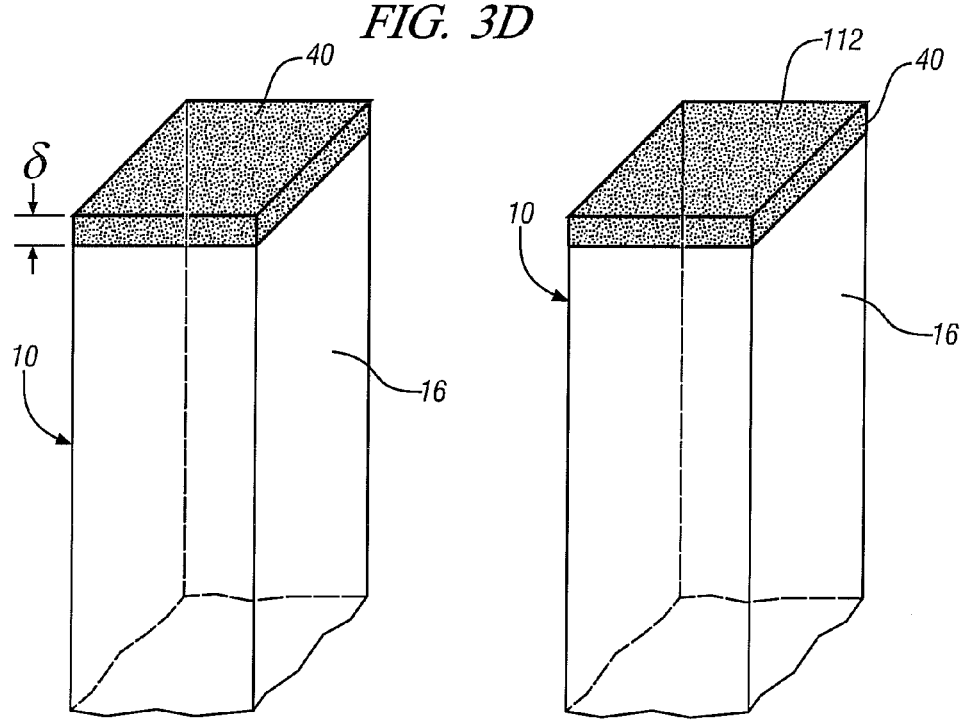
FIG. 3E shows the die insert section of FIG. 3D at the conclusion of friction stir processing.
FIG. 3F shows the die insert section of FIG. 3E after die finishing.

FIG. 3F shows the final result after the tool has traversed the entire workpiece surface—a composite layer 40 of depth δ, where δ is approximately the distance between shoulder 39 and the end 38 of pin 37, that is where δ is approximately the pin length.

In general, the surface of the composite layer after friction stir processing will not be a suitable die surface and some additional surface finishing, typically grinding and polishing will be required to render the finished die surface 112 illustrated in FIG. 3F.

The invention has been particularly described in terms of its utility for sheet forming dies. However it will be appreciated by those skilled in the art that there are numerous applications, such as bearings or slideways, for which it might also be advantageous to modify the surface frictional characteristics. Further, although the invention described has been directed to metallic substrates, thermoplastic polymers, which are generally soft and exhibit poor wear resistance may also be plasticized using friction stir processing and thus might beneficially be processed as described above.

In practice of this invention, grooves of approximate dimensions 0.5 millimeters wide and 1-2 millimeter deep would be prepared on some selected portion(s) comprising up to 10% of the sheet-metal contacting surface of a die or die insert fabricated, for example, of P20 tool steel. At least the regions incorporating the grooves would protrude beyond the intended die surface to provide opportunity for shaping and suitably finishing the surface modified region. The grooves are filled with a pre-selected quantity and blend of friction-modifying particles of size and shape suitable for accommodation in the grooves.

The friction-modifying particles are stirred into and incorporated in the die surface by passage of a friction stir tool participating in a friction stir process, the tool pin typically extending only to a depth generally comparable to the depth of the grooves. A suitable tool material for lubricious particles and low melting point die matrix materials is AISI H13, but more abrasive, wear-resistant particles like silicon carbide would necessitate use of ceramic or metal-matrix composite tools.

It is preferred that the stirring tool traverse the region more than once. These traverses can be done in the same direction as, opposite or at an angle to the direction of the previous pass. A typical stirring depth will be up to 3 millimeters informed by the depth of the grooves as previously discussed.

Friction stir processing will result in displacement of material from the surface and creation of a cavity at the point of tool exit unless an adjustable pin tool is used. In the case of die, the exit location may be positioned in a region of the die which either will not contact the sheet metal or, less preferably, a region of the die which experiences only a low forming pressure. The tool exit hole may be filled by friction welding the hole with a suitable plug or by arc welding. For an insert, it is preferred to make the insert sufficiently oversized to accommodate the entry and exit locations on the excess portion of the insert and remove the excess by machining prior to incorporating the insert in the die.

Finally the friction stir processed surface of the die or insert would be finished by machining and/or grinding and/or polishing to achieve the designated final dimensions and surface finish. The extent of such finishing being at least sufficient to remove any irregularities resulting from friction stir processing and render a continuous surface contour suitable for sheet metal forming.

Thus while the best modes for carrying out the invention for a specific application have been described in detail, those familiar with the art to which this invention relates will recognize various alternative opportunities for practicing the invention within the scope of the appended claims.

The invention claimed is:

1. A method for selectively modifying at least a portion of a metal sheet metal forming die body by creating a composite, lubricious layer of predetermined depth in a surface of the body intended for contact with the sheet metal, the surface for creating such layer protruding beyond the intended die body surface; the method comprising:
    forming indentations protruding in the surface of the body in which the composite layer is to be formed, the indentations being sized and spaced to accept and store a predetermined quantity of particles of a desired material for incorporation of the material in the surface of the die body;
    the surface protruding beyond the intended die body surface to provide excess body material for shaping and suitably finishing the modified surface;
    placing a predetermined quantity of at least one particulate material in the indentations in the surface of the body;
    using a friction stir tool with a pin, the pin having a length and a diameter, to frictionally heat and mix the particulate matter in the indentations with adjacent metal of the body and traversing the friction stir tool across the body to mix the particulate material with the material of the body to a depth substantially equal to the length of the pin, such mixture constituting a precursor of the intended composite layer;

and then performing one or more of machining, grinding and polishing on at least the modified portion of the precursor surface to form the die body and render, on the modified surface portion of the die body, a suitably shaped and lubricious surface for sheet metal contact.

2. The method of claim 1 where indentations are formed in the surface of the body by a process selected from the group consisting of milling, sawing, knurling, shot blasting, grinding, turning or drilling.

3. The method of claim 1 where the particulate material is a hard material selected from the group consisting of aluminum oxide, silicon carbide and cubic boron nitride.

4. The method of claim 1 where the particulate material is a lubricious material selected from the group consisting of boron nitride, molybdenum disulphide and graphite.

5. The method of claim 1 where the predetermined quantity of particulates is selected to achieve a desired concentration of particulates in the composite layer.

6. The method of claim 1 where the particles have a size and the particle size is less than the size of the indentations.

7. A method for selectively modifying at least a portion of a surface layer of a die body as recited in claim 1 wherein the composite layer enhances the wear resistance of the surface layer.

8. A method for selectively modifying at least a portion of a surface layer of a die body as recited in claim 1 wherein the composite layer enhances the lubrication properties of the surface layer.

9. A method for selectively modifying at least a portion of a surface layer of a die body as recited in claim 1 in which the metal body is one of a cast iron or a tool steel.

10. A method for selectively modifying at least a portion of a surface layer of the die body as recited in claim 1, in which the pin diameter is greater than the spacing between indentations and the tool traces a path to process the entire surface of the body containing the particulate, material-containing indentations.

* * * * *